(12) United States Patent
Reed

(10) Patent No.: US 6,594,217 B1
(45) Date of Patent: Jul. 15, 2003

(54) SERVO SYNCH MARK PROCESSING IN A DISK DRIVE SYSTEM

(75) Inventor: David E. Reed, Westminster, CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/338,020

(22) Filed: Jun. 22, 1999

(51) Int. Cl.[7] .................................................. G11B 5/09
(52) U.S. Cl. ............................... 369/59.19; 369/47.48; 341/68; 375/341
(58) Field of Search .......................... 369/59.14, 59.18, 369/59.22, 47.35, 47.48, 59.19; 360/40, 49, 53, 48, 77.08, 65; 375/341, 263, 290; 341/50, 68; 714/752, 769, 792, 789, 795

(56) References Cited

U.S. PATENT DOCUMENTS

| | | | |
|---|---|---|---|
| 5,521,945 A | * 5/1996 | Knudson | 360/65 |
| 5,661,760 A | * 8/1997 | Patapoutian et al. | 360/48 |
| 5,726,818 A | 3/1998 | Reed et al. | |
| 5,737,142 A | 4/1998 | Zook | |
| 5,786,950 A | 7/1998 | Zook et al. | |
| 5,796,535 A | 8/1998 | Tuttle et al. | |
| 5,844,507 A | * 12/1998 | Zook | 341/50 |
| 5,850,377 A | 12/1998 | Taguchi et al. | |
| 5,872,754 A | 2/1999 | Taguchi et al. | |
| 5,926,490 A | 7/1999 | Reed et al. | |
| 5,949,357 A | * 9/1999 | Fitzpatrick et al. | 341/68 |
| 6,201,652 B1 | * 3/2001 | Rezzi et al. | 360/40 |
| 6,345,074 B1 | * 2/2002 | Turk et al. | 360/53 |

OTHER PUBLICATIONS

Stikvoort, Eduard F., "An All–Digital Bit Detector for Compact Disc Players," IEEE Journal on Selected Areas in Communications, vol. 10 ( No. 1), p. one, ( Nov. 17, 1992).
Siegel, Paul H., "Modulation and Coding for Information Storage," IEEE Communications Magazine, IEEE, p. 68–86, (Nov. 17, 1991).

* cited by examiner

Primary Examiner—Paul W. Huber
Assistant Examiner—Kim-Kwok Chu
(74) Attorney, Agent, or Firm—Duft Setter Ollila & Bornsen LLC

(57) ABSTRACT

A disk drive system comprises control circuitry and a disk device. The disk device transfers an analog signal representing servo data and user data from a disk device to the control circuitry. The servo data includes servo synch marks. The control circuitry processes the analog signal to generate a digital signal representing the user data. The control circuitry includes Viterbi circuitry and servo circuitry. The Viterbi circuitry interleaves and sums samples of the analog signal. The Viterbi circuitry then processes the sums using two states, an even magnet length constraint, a D=1 constraint, and a sliding threshold algorithm to generate a bit sequence. The servo circuitry processes the bit sequence to detect the servo synch marks.

26 Claims, 10 Drawing Sheets

SERVO SYNCH MARK PROCESSING IN A DISK DRIVE SYSTEM

BACKGROUND OF THE INVENTION

1. Field of the Invention

The invention is related to the field of disk drive systems, and in particular, to disk drive systems and circuitry that process servo synch marks using a two-state Viterbi circuit and an even magnet length constraint.

2. Statement of the Problem

FIG. 1 is a block diagram of a conventional disk drive system 100 connected to a computer system 102. The disk drive system 100 includes control circuitry 104 and disk device 106. The disk device 106 stores user data 108 and servo data 110. The servo data 110 includes servo synch marks 112.

In operation, the computer system 102 exchanges the user data 108 with the control circuitry 104. The control circuitry 104 exchanges the user data 108 with the disk device 106 for storage. To facilitate these data exchanges, the disk device 106 reads and transfers the servo data 110 including the servo synch marks 112 to the control circuitry 104. The control circuitry 104 uses the servo data 110 to control the operation of the disk device 106.

FIG. 2 depicts a block diagram of the control circuitry 104 and the disk device 106 with an overhead view of the disk device 106. The disk device includes a disk surface 216 and a head 218. The disk surface 216 has circular data tracks that include the user data 108 depicted by dashed lines and the servo data 110 depicted by solid lines. The servo synch marks 112 are depicted by an "X" within the servo data 110. The control circuitry 104 includes a read channel 222 and servo control 226. The read channel 222 includes Viterbi circuitry 224. The servo control 226 includes the synch mark detector 228. There are typically many more disk surfaces, heads, data tracks, and control circuits in a disk drive, but the number depicted is restricted for clarity. For example, the read channel 222 typically includes a sampling circuit, adaptive filter, detector, and decoder.

As the disk surface 216 spins, the user data 108 and the servo data 110 pass under the head 218. The head 218 reads and transfers this data in the analog read signal 220 to the read channel 222. The read channel 222 samples and filters the analog read signal 220. The read channel 222 uses the Viterbi circuitry 224 to process these filtered samples to detects bits. The read channel 222 transfers the resulting bit sequence 225 to the servo control 226.

The synch mark detector 228 detects the servo synch marks 112 by recognizing a pattern in the bit sequence 225. The servo control 226 uses the servo synch mark to locate desired data in a data track by tracking the time since servo synch mark detection as the disk surface 216 spins. Thus, the servo control 226 locates the user data 108 and the servo data 110 based on synch mark detection. The servo control 226 provides a position control signal 229 to the disk device 106.

The analog read signal 220 that represents the servo synch marks 112 includes noise that disrupts synch mark detection. The Viterbi circuitry 224 processes samples of the noisy read signal 220 to select the most likely series of bits for accurate servo synch mark detection by servo synch mark detector 226. The Viterbi circuitry 224 implements a state machine that is characterized by the number of states and permissible transitions from one state to another. The Viterbi circuitry 224 uses a D=N constraint based on the number of zeros that are required between consecutive ones in the servo data 110. A D=0 constraint indicates that consecutive ones are permitted, and a D=1 constraint indicates that one zero is required between consecutive ones.

FIG. 3 shows a conventional state machine 324 for use in the Viterbi circuitry 224. The state machine 324 has eight states and uses EPR4 and D=0. The state machine 324 receives filtered samples of the read signal and produces the likely bit sequence as the output.

FIG. 4 shows another conventional state machine 424 for use in the Viterbi circuitry 224. The state machine 424 has four states and uses PR4 and D=0. The state machine 424 receives read signal samples as the input and produces the likely bit string as the output.

FIG. 5 shows another conventional state machine 524 for use in the Viterbi circuitry 224. The state machine 524 is a reduction of the state machine 424 of FIG. 4. The state machine 524 has two halves—524a and 524b. The read signal samples are de-interleaved so each half 524a, 524b receives every other sample of the read signal 220. The state machine 524 provides an interleaved bit sequence as the output.

FIG. 6 depicts a block diagram of Viterbi circuitry 624 that implements the state machine 524. The decimator circuits each receive read signal samples as the input. The decimator circuits eliminate every other sample in an alternating fashion to generate interleaved samples for the delay circuits. The delay circuits introduce a two clock cycle delay into the interleaved samples, and provide the delayed-interleaved samples to the Viterbi detectors. The Viterbi detectors each implement one of the halves 524a, 524b of the state machine 524. The Viterbi detectors are implemented using the sliding threshold algorithm to produce the interleaved bit sequence as the output.

The sliding threshold algorithm is a well known implementation of the Viterbi algorithm for the two-state di-code signal. The state update process of the Viterbi algorithm is reduced to comparing each input sample to two dynamic, or sliding, thresholds. Depending on the results of these comparisons, the thresholds and data path memories are updated. The details of the sliding threshold algorithm and the equivalence to the di-code Viterbi algorithm are well known.

Unfortunately, system noise causes these conventional Viterbi circuits provide bit sequences with errors. Errors in the bit sequence cause a failure of servo synch mark detection. The disk drive system 100 cannot exchange user data with the computer system 102 when servo synch mark detection fails. It should be appreciated that servo synch mark detection is critical to the operation of the disk device 100, and to the effectiveness of the computer system 102. Thus, improved Viterbi circuitry that provides a more accurate bit string would improve servo synch mark detection with a corresponding improvement in the operation of disk drive systems and computers.

Given the enormous growth in the demand for computer data storage, there is an acute need to continually improve the performance of disk drive systems. In particular, solutions are needed to reduce problems with servo synch mark detection. These solutions will provide for faster and more accurate data exchanges between the disk drive system and the computer system.

SUMMARY OF THE SOLUTION

The invention solves the above problem by providing improved Viterbi circuitry to process samples of the read signal to generate an accurate bit sequence for servo synch mark detection. The invention improves the operation of disk drives and computers by providing faster and more accurate data exchanges.

The invention includes disk drive circuitry, systems, and methods. The disk drive system comprises control circuitry and a disk device. The disk device transfers an analog signal representing servo data and user data from a disk device to the control circuitry. The servo data includes servo synch marks. The control circuitry includes Viterbi circuitry and servo circuitry. The Viterbi circuitry interleaves and sums samples of the analog signal. The Viterbi circuitry then processes the sums using two states, an even magnet length constraint, a D=1 constraint, and a sliding threshold algorithm to generate a bit sequence. The servo circuitry processes the bit sequence to detect the servo synch marks. The control circuitry also processes the analog signal to generate a digital signal representing the user data.

DETAILED DESCRIPTION OF THE INVENTION

Figure 7:
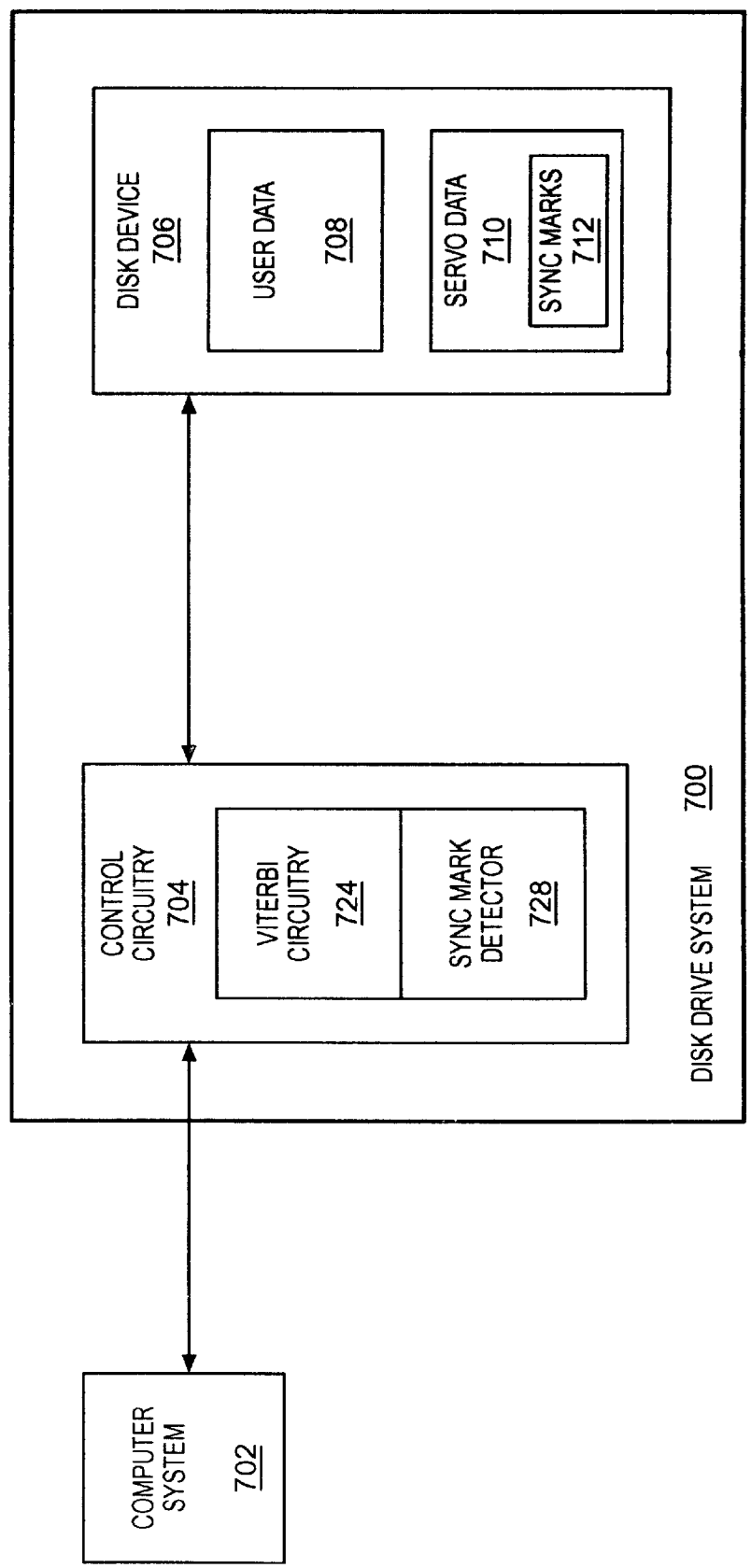
FIG. 7 is a block diagram that depicts a disk drive system in an example of the invention.

Disk Drive System Control Circuitry—FIG. 7

FIG. 7 is a block diagram of a new disk drive system 700 connected to a computer system 702. The disk drive system 700 includes control circuitry 704 and disk device 706. The disk device 706 stores user data 708 and servo data 710. The servo data 710 includes servo synch marks 712. The control circuitry 704 includes Viterbi circuitry 724 and synch mark detector 728.

In operation, the computer system 702 exchanges the user data 708 with the control circuitry 704. The control circuitry 704 exchanges the user data 708 with the disk device 706 for storage. To facilitate these data exchanges, the disk device 706 reads and transfers a read signal to the control circuitry 704. The read signal contains analog representations of the servo data 710 including the servo synch marks 712. The control circuitry 104 uses the servo data 710 from the read signal to control the operation of the disk device 706. In particular, the Viterbi circuitry 724 processes samples of the read signal to produce a bit sequence, and the servo synch mark detector 728 matches the bit sequence to a known pattern to detect the servo synch marks 712. Two examples of the pattern follow below, but other examples are also within the scope of the invention.

NRZI pattern: 0 0 1 0 1 0 1 0 0 0 1 0 0 0 1 0 0 0 0 0 1 0 0 0 1 0

SPR4 pattern: 0 0 1 1-1-1 1 1 0 0-1-1 0 0 1 1 0 0 0 0-1-1 0 0 1 1

Figure 8:
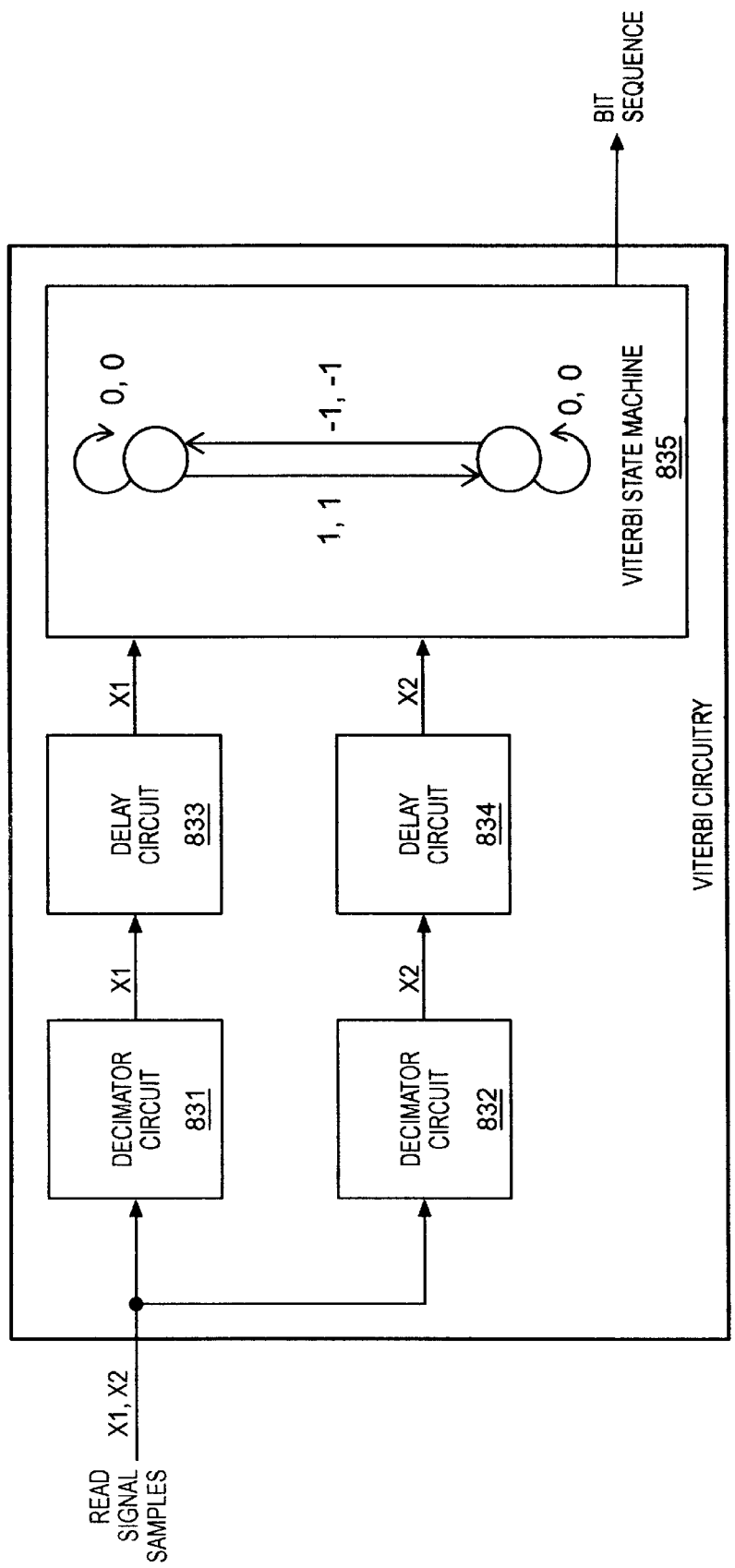
FIG. 8 is a block diagram that depicts Viterbi circuitry in an example of the invention.
Figure 9:
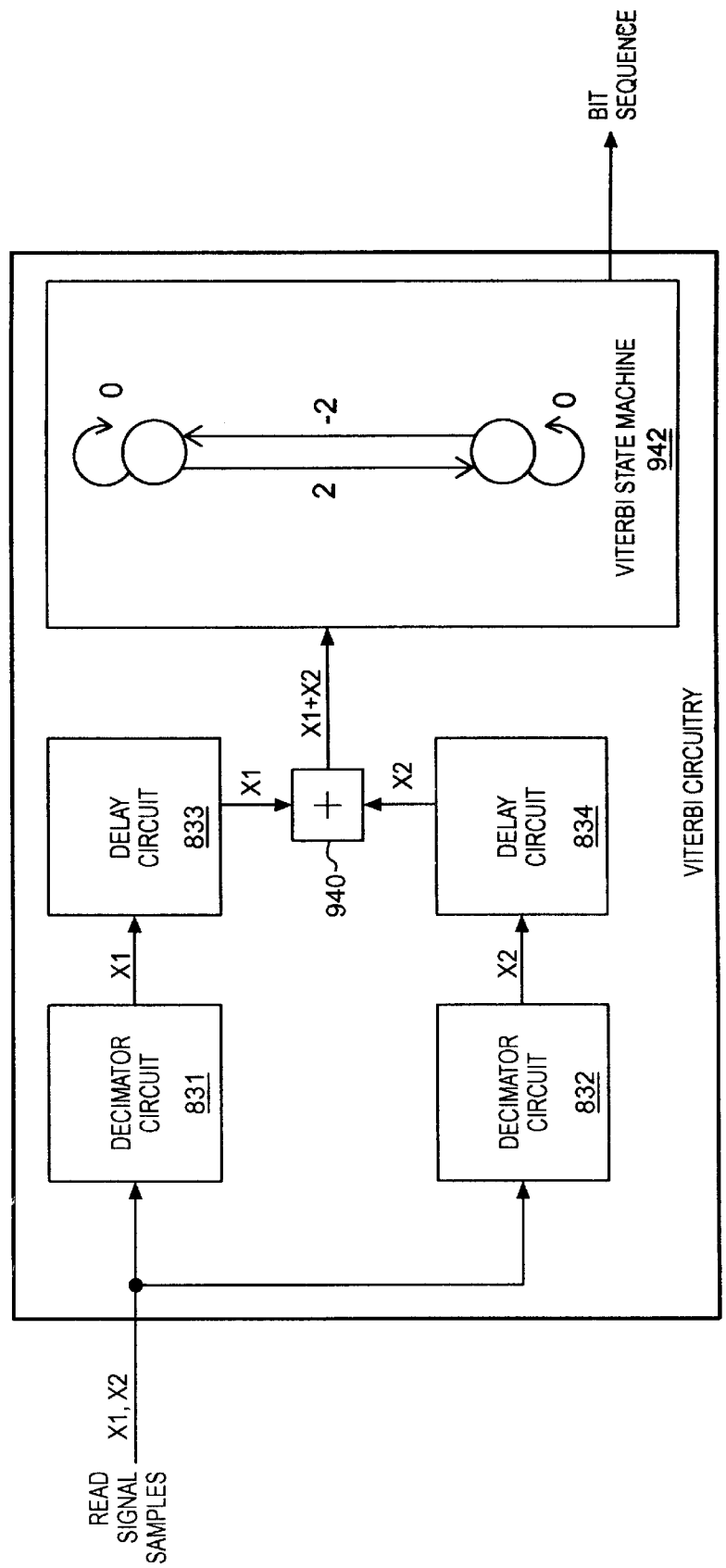
FIG. 9 is a block diagram that depicts Viterbi circuitry in an example of the invention.

Viterbi Circuitry—FIGS. 8–9

FIG. 8 shows one version of Viterbi circuitry 724 that includes decimator circuits 831 and 832, delay circuits 833 and 834, and Viterbi state machine 835. The decimator circuits 831, 832 each receive read signal samples as the input. The decimator circuits 831, 832 eliminate every other sample in an alternating fashion to generate interleaved samples for the delay circuits 833, 834. The delay circuits 833,834 introduce delay into the interleaved samples to synchronize consecutive samples for input to the Viterbi state machine 835 at the same time. For example, both decimator circuits 831, 832 might receive consecutive samples X1 and X2. The decimator circuit 831 would eliminate X2 and pass X1 to the delay circuit 833. The decimator circuit 832 would eliminate X1 and pass X2 to the delay circuit 833. The delay circuits 833, 834 would respectively delay X1, X2 to provide the samples to the Viterbi state machine 835 at the same time.

Figure 1:
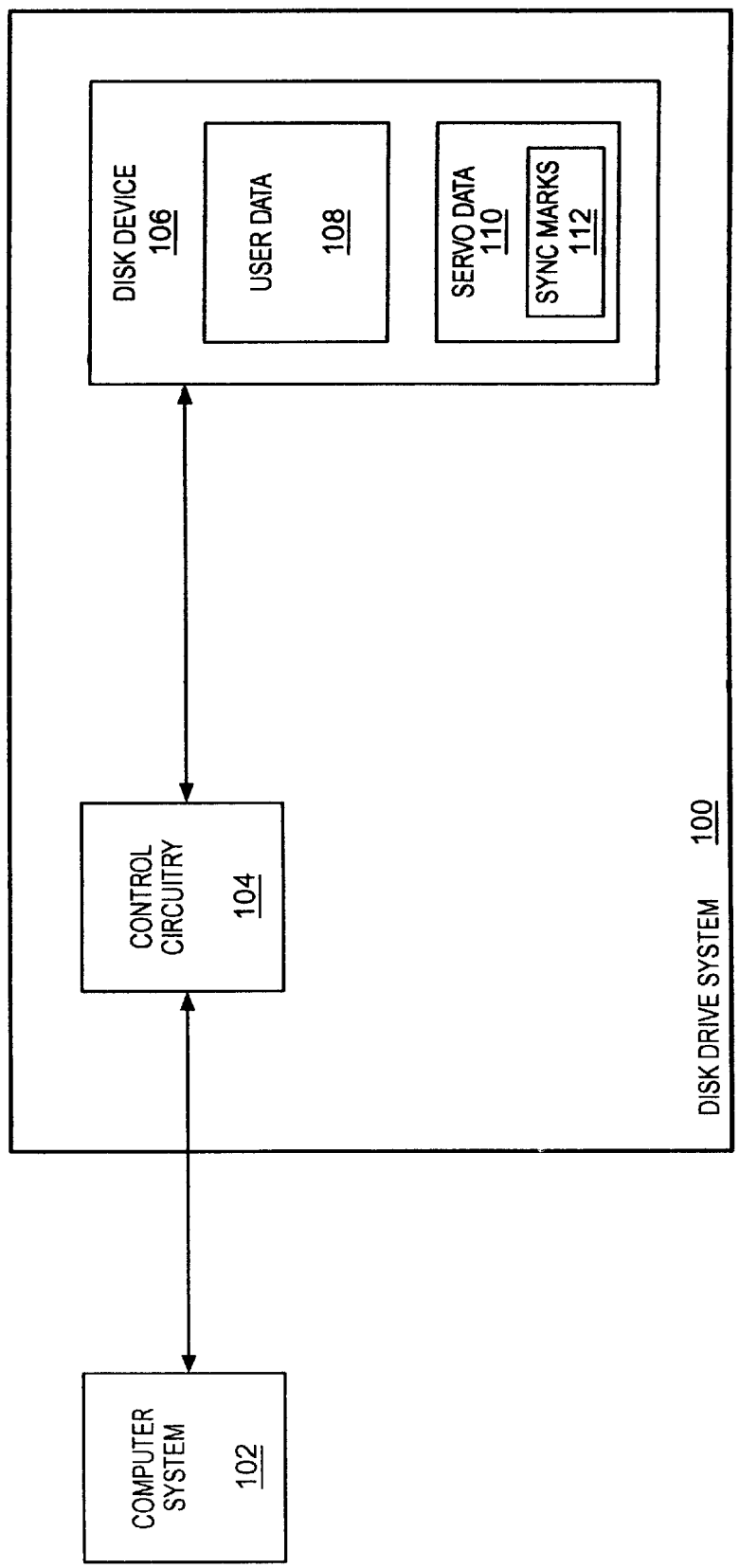
FIG. 1 is a block diagram that depicts a conventional disk drive system.
Figure 2:
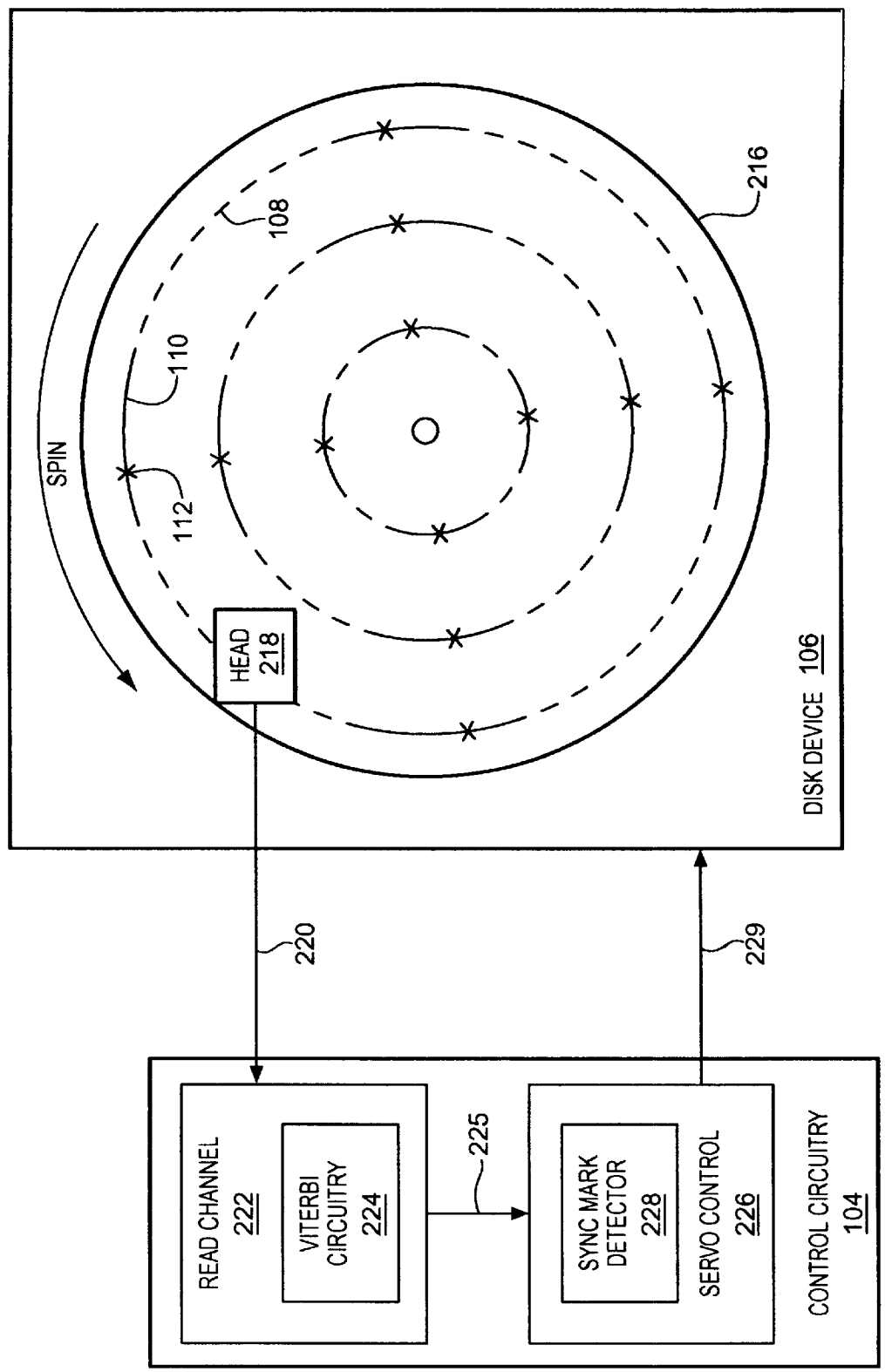
FIG. 2 is a block diagram that depicts a conventional disk device and disk drive control circuitry.
Figure 3:
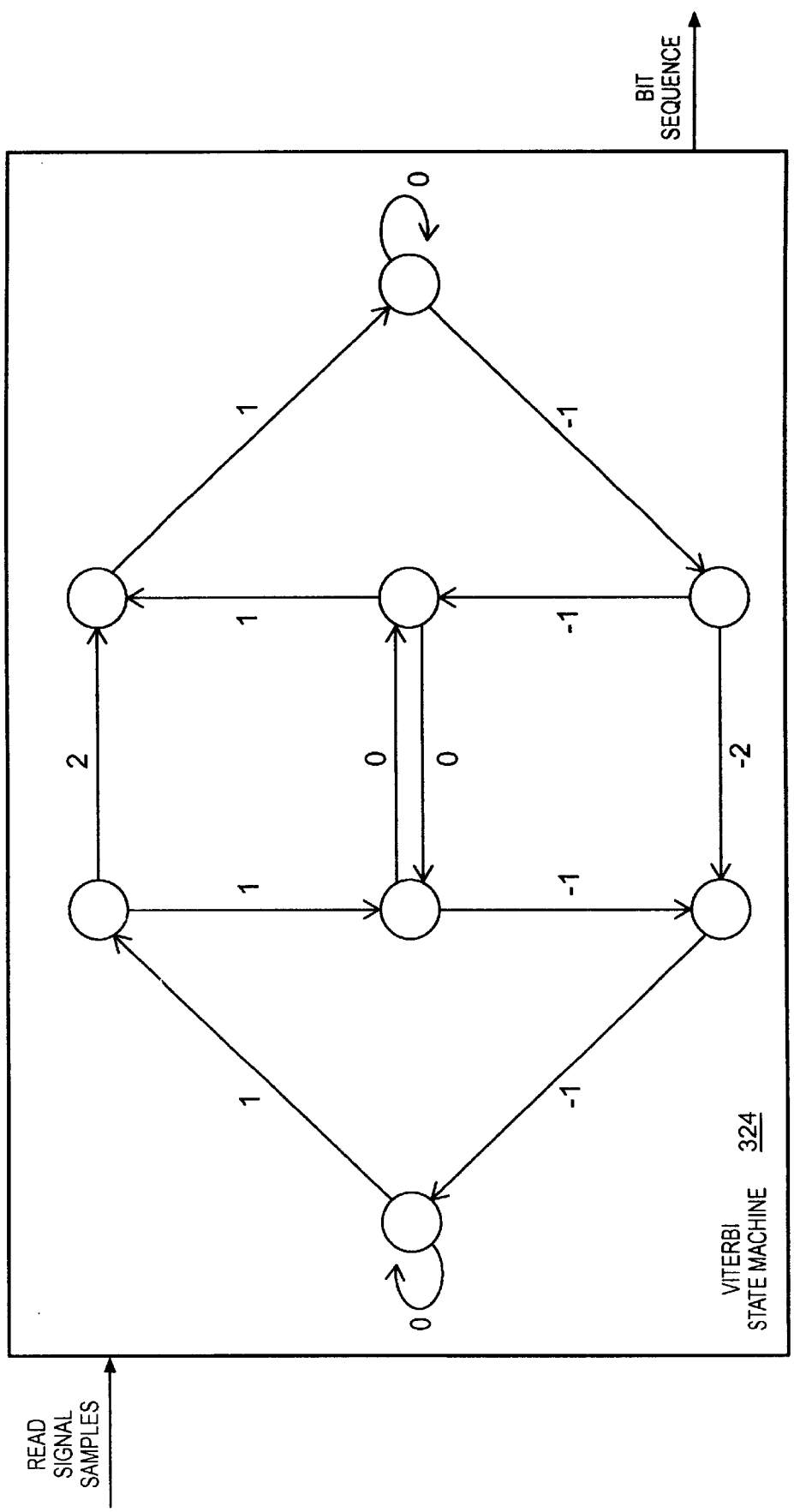
FIG. 3 is a block diagram that depicts a conventional Viterbi state machine with eight states.
Figure 4:
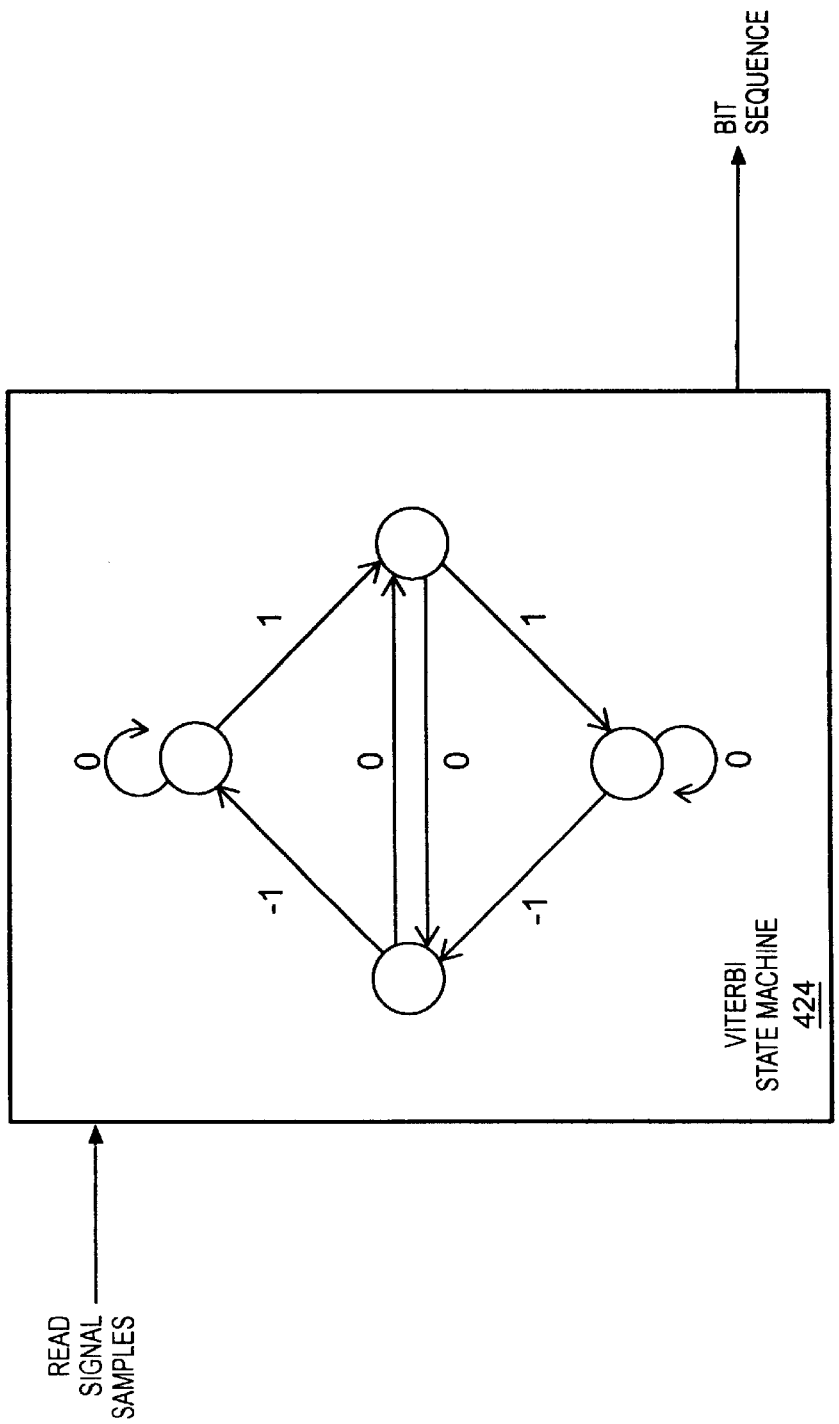
FIG. 4 is a block diagram that depicts a conventional Viterbi state machine with four states.
Figure 5:
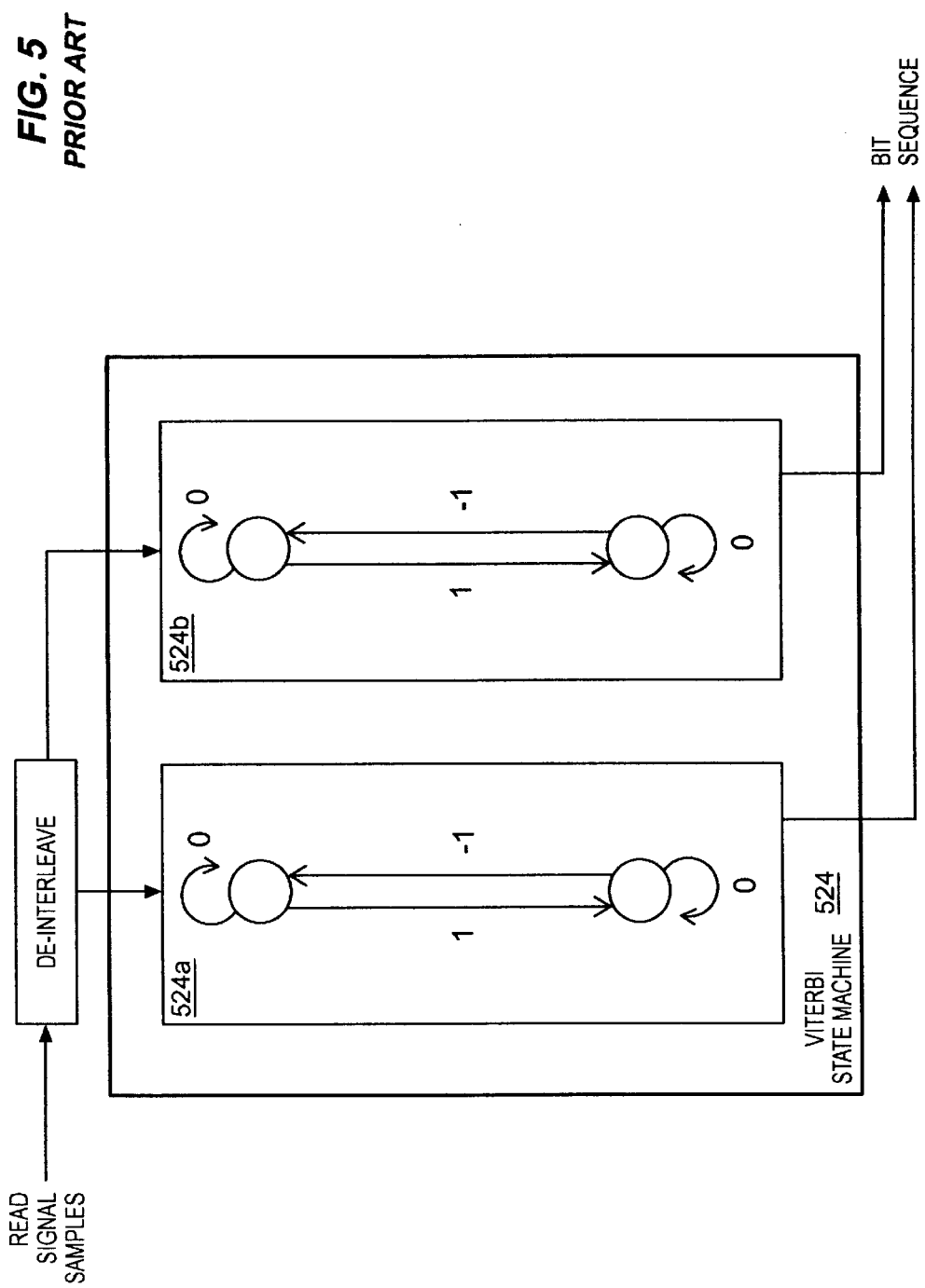
FIG. 5 is a block diagram that depicts a conventional reduction of the Viterbi state machine of FIG. 4.
Figure 6:
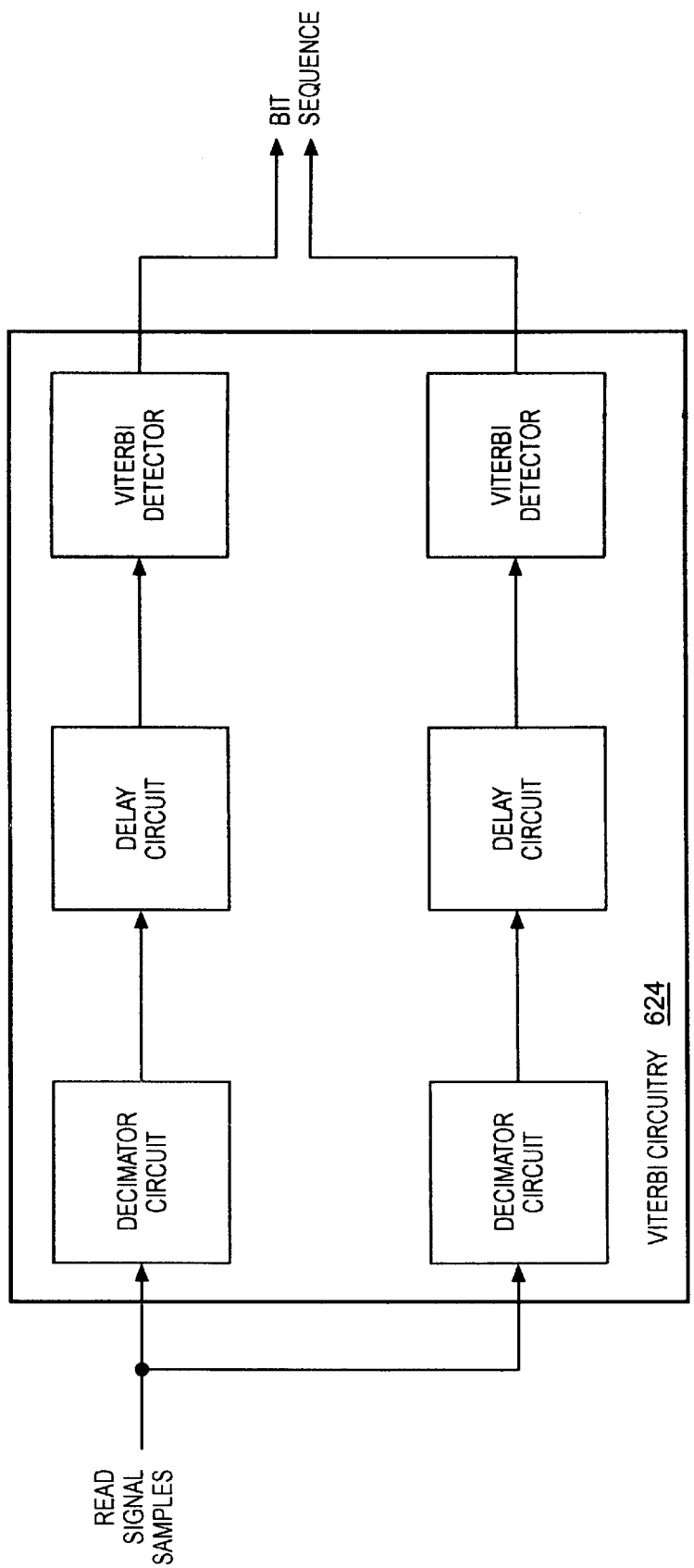
FIG. 6 is a block diagram that depicts conventional circuitry to implement the Viterbi state machine of FIG. 5.

The Viterbi state machine 835 processes the samples from the delay circuits 833,834 to produce the bit sequence. The Viterbi state machine 835 uses two states, PR4 data, and a D=1 constraint. The Viterbi state machine 835 is also constrained by even magnet length where magnetic transitions on the disk must occur at even. number bit times. For example, the NRZ data sequence "1 0 1" produces a 2-length magnet, and the NRZ data sequence "1 0 0 0 1" produces a 4-length magnet. Those skilled in the art are familiar with even magnet length, PR4, and D=1, but these technologies have not yet been combined in the context of the invention. It should be noted that the Viterbi state machine 835 is similar to one of the halves 524a, 524b from the state machine 524 of FIG. 5. Advantageously, the design for these state machines is tested and available.

FIG. 9 shows another version of Viterbi circuitry 724 that includes decimator circuits 831 and 832, delay circuits 833 and 834, sum circuit 940, and Viterbi state machine 942. The decimator circuits 831, 832 each receive read signal samples as the input. The decimator circuits 831, 832 eliminate every other sample in an alternating fashion to generate interleaved samples for the delay circuits 833, 834. The delay circuits 833,834 introduce delay into the interleaved samples to synchronize consecutive samples for input to sum circuit 940 at the same time. For example, both decimator circuits 831, 832 might receive consecutive samples X1 and X2. The decimator circuit 831 would eliminate X2 and pass X1 to the delay circuit 833. The decimator circuit 832 would eliminate X1 and pass X2 to the delay circuit 833. The delay circuits 833, 834 would respectively delay X1, X2 to provide the samples to the sum circuit 940 at the same time.

The sum circuit 940 adds the samples from the delay circuits 833, 834 and provides the sum to the Viterbi state machine 942. The Viterbi state machine 942 processes the summed samples from the sum circuit 940 with a half-clock rate constraint to produce the bit sequence. The Viterbi state machine 942 uses two states, PR4 data, a D=1 constraint, and a sliding threshold algorithm. The Viterbi state machine 942 is also constrained by even magnet length where magnetic transitions on the disk must occur at even number bit times. Those skilled in the art are familiar with even magnet length, PR4, D=1, and the sliding threshold algorithm, but these technologies have not yet been combined in the context of the invention. It should be noted that the Viterbi state machine 942 is similar to one of the halves 524a, 524b from the state machine 524 of FIG. 5. Advantageously, the design for these state machines is tested and available.

Figure 10:
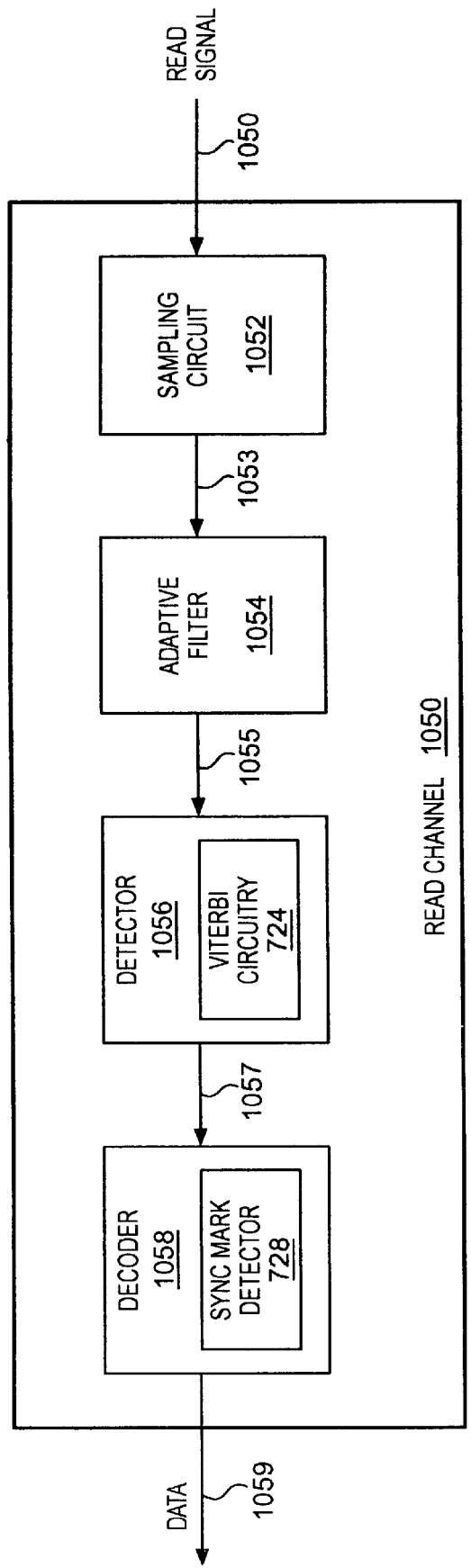
FIG. 10 is a block diagram that depicts a read channel in an example of the invention.

Read Channel—FIG. 10

FIG. 10 depicts a read channel 1050 that could comprise a portion of the disk drive control circuitry 704 of FIG. 7. The read channel 1050 includes a sampling circuit 1052, an adaptive filter 1054, a detector 1056, and a decoder 1058. The sampling circuit 1052 receives a read signal 1050 from the disk device 706. The read signal 1050 is an analog and encoded representation of the user data 708 and the servo data 710 including the servo synch marks 712.

The sampling circuit 1052 samples the read signal 1050 to generate samples 1053 for the adaptive filter 1054. The adaptive filter 1054 digitally shapes the samples 1053 to produce an equalized signal 1055 for the detector 1056. The detector 1056 detects encoded signals 1057 from the equalized signal 1055 and transfers the encoded signals 1057 to the decoder 1058. The detector 1056 includes the Viterbi circuitry 724 that is described above. The Viterbi circuitry 724 processes portions of the equalized signal 1055 to produce portions of the encoded signals 1057 for the decoder 1058.

The decoder 1058 decodes the encoded signals 1057 into the data 1059. The data 1059 should replicate the user data 708 and the servo data 710. The decoder 1058 includes the synch mark detector 728 that is described above. The synch mark detector 728 matches a bit sequence from the Viterbi circuitry 724 in the signal 1057 to a known pattern to detect the servo synch marks. Those skilled in the art will appreciate that the detector 1056 and the decoder 1058 could be distributed across separate functional blocks for user data and for servo data.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. Disk drive control circuitry comprising:
   Viterbi circuitry having two states and an even magnet length constraint and configured to process a signal representing servo synch marks to generate a bit sequence; and
   servo circuitry configured to process the bit sequence to detect the servo synch marks.

2. The disk drive control circuitry of claim 1 wherein the Viterbi circuitry is configured to interleave and sum samples of the signal.

3. The disk drive control circuitry of claim 1 wherein the Viterbi circuitry is configured for a D=1 constraint.

4. The disk drive control circuitry of claim 1 wherein the Viterbi circuitry is configured to use a sliding threshold algorithm.

5. The disk drive control circuitry of claim 1 wherein the Viterbi circuitry is configured for PR4 data.

6. The disk drive control circuitry of claim 1 wherein the disk drive control circuitry is in read channel circuitry.

7. A disk drive system comprising;
   a disk device configured to store servo data including servo synch marks and user data and to transfer an analog signal representing the servo data and the user data; and
   control circuitry configured to process the analog signal to generate a digital signal representing the user data, to process the analog signal with Viterbi circuitry having two states and an even magnet length constraint to generate a bit sequence including the servo synch marks, and to process the bit sequence to detect the servo synch marks.

8. The disk drive system of claim 7 wherein the Viterbi circuitry is configured to interleave and sum samples of the analog signal.

9. The disk drive system of claim 7 wherein the Viterbi circuitry is configured for a D=1 constraint.

10. The disk drive system of claim 7 wherein the Viterbi circuitry is configured to use a sliding threshold algorithm.

11. The disk drive system of claim 7 wherein the Viterbi circuitry is configured for PR4 data.

12. A method for operating disk drive control circuitry, the method comprising:
    processing a signal representing servo synch marks with Viterbi circuitry having two states and an even magnet length constraint to generate a bit sequence; and
    processing the bit sequence with servo circuitry to detect the servo synch marks.

13. The method of claim 12 wherein processing the signal with the Viterbi circuitry comprises interleaving and summing samples of the signal.

14. The method of claim 12 wherein the Viterbi circuitry processes the signal with a D=1 constraint.

15. The method of claim 12 wherein the Viterbi circuitry processes the signal with a sliding threshold algorithm.

16. The method of claim 12 wherein the Viterbi circuitry is configured for PR4 data.

17. A method for operating a disk drive system comprising;
    transferring an analog signal representing servo data and user data from a disk device to control circuitry wherein the servo data includes servo synch marks;
    processing the analog signal in the control circuitry to generate a digital signal representing the user data;
    processing the analog signal in the control circuitry with Viterbi circuitry having two states and an even magnet length constraint to generate a bit sequence including the servo synch marks; and
    processing the bit sequence in the control circuitry to detect the servo synch marks.

18. The method of claim 17 wherein processing the signal with the Viterbi circuitry comprises interleaving and summing samples of the signal.

19. The method of claim 17 wherein the Viterbi circuitry processes the signal with a D=1 constraint.

20. The method of claim 17 wherein the Viterbi circuitry processes the signal with a sliding threshold algorithm.

21. The method of claim 17 wherein the Viterbi circuitry is configured for PR4 data.

22. A read channel comprising:
    a sampling circuit configured to receive and sample a read signal from a disk device to generate samples;
    an adaptive filter configured to shape the samples to produce an equalized signal;
    a detector configured to detect encoded signals in the equalized signal wherein the detector includes Viterbi circuitry having two states and an even magnet length constraint and configured to process portions of the equalized signal representing servo synch marks to generate portions of the encoded signals; and
    a decoder configured to decode the encoded signals into user data and servo data.

23. The read channel of claim 22 wherein the decoder includes a synch mark detector configured to process a bit sequence in the encoded signals to detect the servo synch marks.

24. The read channel of claim 22 wherein the Viterbi circuitry is configured to interleave and sum portions of the equalized signal.

25. The read channel of claim 22 wherein the Viterbi circuitry is configured for a D=1 constraint.

26. The read channel of claim 22 wherein the Viterbi circuitry is configured to use a sliding threshold algorithm.

* * * * *